Figure 1:
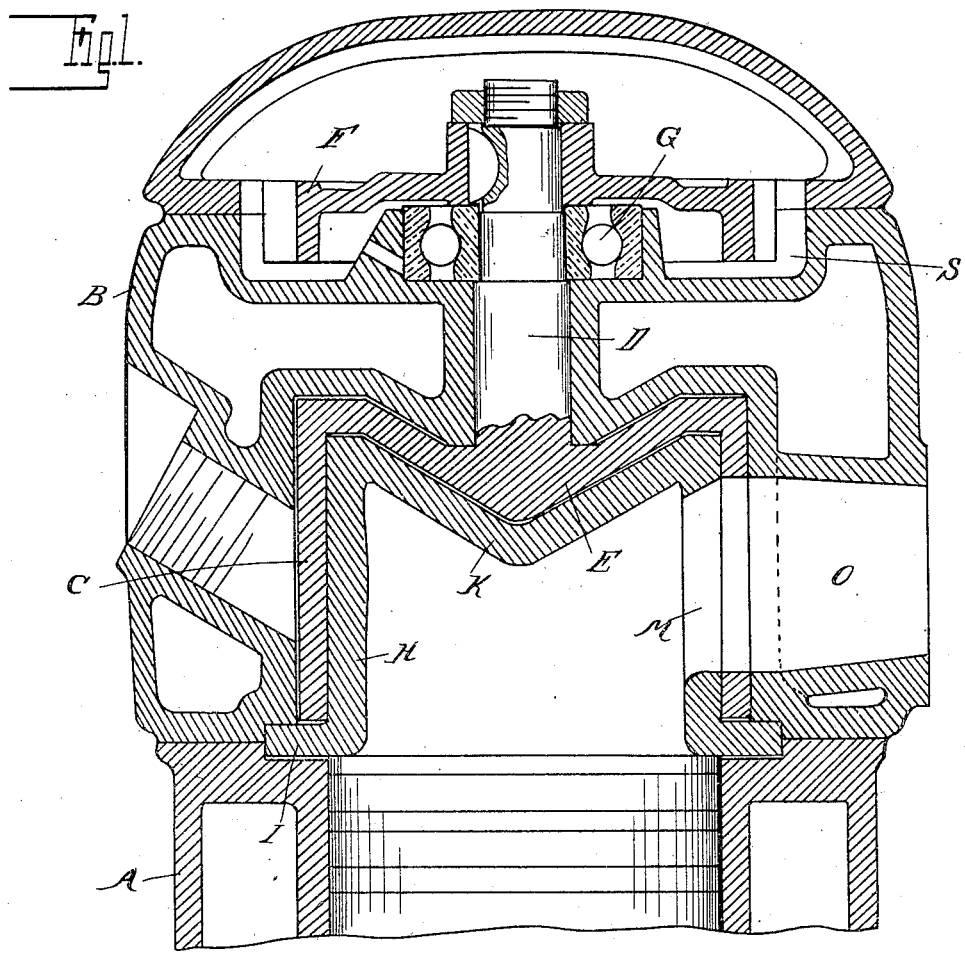

H. E. COFFIN.
ROTARY VALVE FOR EXPLOSION ENGINES.
APPLICATION FILED MAY 4, 1914.

1,126,706.

Patented Feb. 2, 1915.
2 SHEETS—SHEET 1.

WITNESSES:
W. K. Ford
James P. Barry

INVENTOR
Howard E. Coffin
BY
Whittemore, Hulbert & Whittemore
ATTORNEYS

H. E. COFFIN.
ROTARY VALVE FOR EXPLOSION ENGINES.
APPLICATION FILED MAY 4, 1914.
1,126,706.
Patented Feb. 2, 1915.
2 SHEETS—SHEET 2.
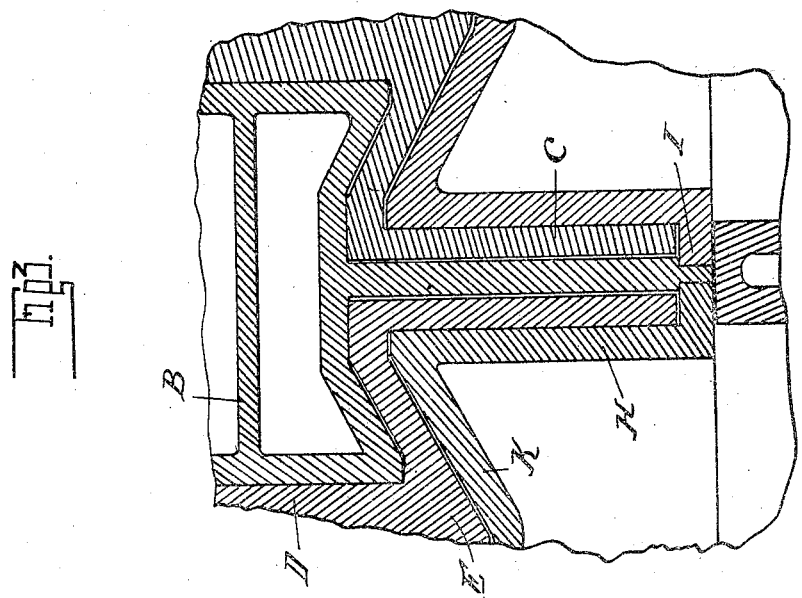
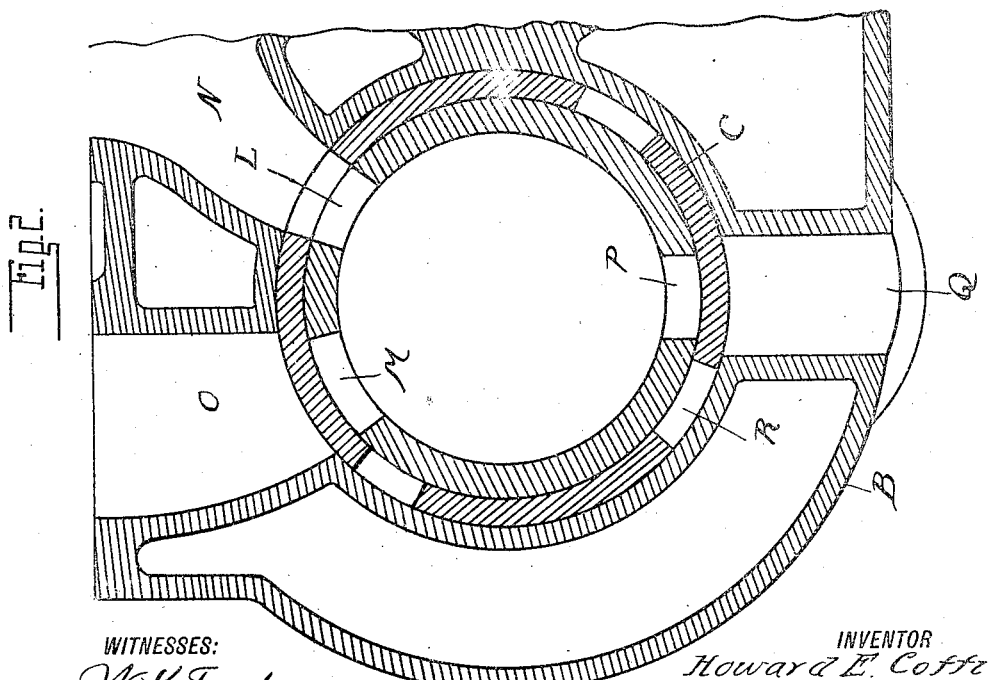
WITNESSES:
WK Ford
James P. Barry
INVENTOR
Howard E. Coffin
BY
Whittemore Hulbert & Whittemore
ATTORNEYS

UNITED STATES PATENT OFFICE.

HOWARD E. COFFIN, OF DETROIT, MICHIGAN.

ROTARY VALVE FOR EXPLOSION-ENGINES.

1,126,706.      Specification of Letters Patent.      Patented Feb. 2, 1915.

Application filed May 4, 1914. Serial No. 836,808.

*To all whom it may concern:*

Be it known that I, HOWARD E. COFFIN, a citizen of the United States of America, residing at Detroit, in the county of Wayne and State of Michigan, have invented certain new and useful Improvements in Rotary Valves for Explosion-Engines, of which the following is a specification, reference being had therein to the accompanying drawings.

The invention relates to rotary valves for explosion engines of that type in which the axis of rotation is coincident with the axis of the cylinder.

It is the object of the invention to obtain a more perfect seal; further, to protect the valve from the heat and pressure developed in the explosion chamber; and further, to obtain a construction which may be cheaply manufactured, easily assembled and is accessible for adjustment or repairs.

In the drawings:—Figure 1 is a vertical central section through a portion of an engine cylinder to which my valve is applied; Fig. 2 is a horizontal section thereof; and Fig. 3 is a vertical section at right angles to Fig. 1.

A is the engine cylinder preferably provided with the usual water jacket, and B is a detachable water jacketed head which is recessed to form the clearance space for the compressed explosive charge.

My improved rotary valve is of a cup form arranged with the recess in the head B and having its axis of rotation coincident with the longitudinal axis of the cylinder.

As shown, C is a cylindrical portion of the valve which is united to the shaft or spindle D by a downward dished web portion E. At the upper end of the spindle is a gear or other drive wheel F and a bearing G preferably arranged approximately in the plane of said wheel holds said spindle in proper alinement.

To protect the valve from the heat and pressure of the explosion chamber a cup-shaped lining H is arranged within the cylindrical portion of the valve. This lining cup is provided with the outwardly-extending flange I which is preferably seated in a recess between the cylinder A and head B, thereby forming a gas-proof joint. The flange I also overlaps the lower end of the valve C and together with the cylindrical portion of the lining and the outer cylindrical wall J of the head, forms an annular recess for receiving the cylindrical portion C of the valve. The lining H is also centrally depressed at K in conformity to the depression in the web E of the valve, the lowest point being in line with the axis.

L is an inlet port and M an outlet port in the lining H, which ports register with corresponding passages N and O formed in the cylinder head. There is also preferably a port P in the lining registering with a chamber Q for the spark plug, and the area of this port P may be proportioned to partially or wholly balance the ports L and M.

R are ports formed in the cylindrical portion of the valve suitably positioned to register successively with the ports L M and P, there being preferably a plurality of said ports R on opposite sides of the valve so as to reduce the angular speed thereof.

To obtain proper lubrication and also to complete the seal of the valve, a suitable lubricant may be fed downward along the spindle and then distributed over the surface of the valve by centrifugal action. Preferably the drive-wheel F is arranged in a recess S in the head B, which recess is filled with lubricant. From this recess a portion of the lubricant is fed downward along the spindle where it will collect in the pocket formed by the depressed portions E and R of the valve and the lining cup. This will insure sealing against leakage of the compressed gases about the spindle while centrifugal action will cause the oil to be thrown outward and to lubricate and seal the clearance space between the cylindrical portion of the valve and the adjacent cylindrical walls of the head and lining cup. Thus a gas-proof seal is maintained, while the fact that the ported face of the valve is cylindrical insures equal wear in all portions thereof.

My improved valve construction is applicable either to single cylinder engines or to multi-cylinder engines, as shown in Fig. 2.

To facilitate the distribution of the lubricant suitable channels may be formed in the face of the valve or its contacting seat.

What I claim as my invention is;—

1. In an explosion engine, the combination with the cylinder of a recessed and ported head therefor, a cupped valve having its axis coincident with the axis of the cylinder and fitting within said recess, and a cupped lining flanged at its lower end for protecting said cup valve from heat and pressure developed in the explosion chamber, said lining being ported in registration with the ports in said head and said valve being provided with a coöperating port.

2. In an explosion engine, the combination with the cylinder and a detachable recessed head therefor, of an inverted cup-shaped lining fitting within the recess of said head and flanged to be clamped and sealed between the head and cylinder, said lining forming an annular recess between the same and the inner wall of the head, and a valve arranged to rotate in said annular recess.

3. In an explosion engine, the combination with the cylinder, of a recessed detachable head therefor, an inverted cup-shaped lining arranged within the recess of said head and having an outwardly-extending flange at its lower end clamped between the head and cylinder, and a valve having an annular portion fitting between said lining and head and having a web portion also between said cup and head, connecting with the central spindle or drive-shaft, said valve, lining and head being provided with coöperating ports.

4. In an explosion engine, the combination with the cylinder, of a detachable recessed head therefor, an inverted cup-shaped lining fitting within the recess of said head and spaced therefrom, the lower end of said lining being provided with an outwardly-extending flange clamped between said head and cylinder and the central portion of said cup being dished or centrally depressed, a cup valve fitting between said cup lining and said recessed head, said valve having its central portion depressed in correspondence with the depression in said lining, and a spindle or drive-shaft for said valve passing outward through said head.

5. In an explosion engine, the combination with a cylinder, of a detachable recessed head therefor, an inverted cup-shaped lining fitting within the recess of said head, with a clearance space therebetween, the lower end of said lining being provided with an outwardly-extending flange clamped between said head and cylinder and the upper portion of said cup being provided with a conical depression, a cup-shaped valve fitting between said lining and head with its upper portion centrally depressed in correspondence to said lining, a spindle or drive shaft for said valve passing axially outward through said head, and rotary driving means mounted on said spindle.

6. In an explosion engine, the combination with a cylinder, of a detachable recessed and water-jacketed head, an inverted cup lining engaging said recess and provided at its lower end with an outwardly-extending flange clamped between said head and cylinder, the upper portion of said lining being conically depressed, a cup valve fitting between said lining and recessed head having its upper end conically depressed to conform to the shape of said lining, a spindle or drive-shaft passing axially out from the central portion of said valve, and a drive wheel mounted on said spindle.

In testimony whereof I affix my signature in presence of two witnesses.

HOWARD E. COFFIN.

Witnesses:
LENA M. CARLE,
ROY D. CLAPIN.